(12) United States Patent
Standke et al.

(10) Patent No.: US 7,781,520 B2
(45) Date of Patent: Aug. 24, 2010

(54) HIGH-VISCOSITY AQUEOUS EMULSIONS OF FUNCTIONAL ALKOXYSILANES, CONDENSED OLIGOMERS THEREOF, ORGANOPOLYSILOXANES, THEIR PREPARATION AND USE FOR SURFACE TREATMENT OF INORGANIC MATERIALS

(75) Inventors: Burkhard Standke, Loerrach (DE); Kerstin Weissenbach, Bad Saeckingen (DE); Bernd Bartkowiak, Wehr-Oeflingen (DE)

(73) Assignee: Evonik Degussa GmbH, Essen (DE)

( * ) Notice: Subject to any disclaimer, the term of this patent is extended or adjusted under 35 U.S.C. 154(b) by 340 days.

(21) Appl. No.: 11/814,127

(22) PCT Filed: Dec. 8, 2005

(86) PCT No.: PCT/EP2005/056595

§ 371 (c)(1),
(2), (4) Date: Jul. 17, 2007

(87) PCT Pub. No.: WO2006/081891

PCT Pub. Date: Aug. 10, 2006

(65) Prior Publication Data

US 2008/0188617 A1  Aug. 7, 2008

(30) Foreign Application Priority Data

Feb. 3, 2005 (DE) .................. 10 2005 004 871

(51) Int. Cl.
*B32B 3/00* (2006.01)
*C08L 83/06* (2006.01)

(52) U.S. Cl. ............... 524/837; 428/304.4; 428/305.5; 428/306.6; 428/307.3

(58) Field of Classification Search .............. None
See application file for complete search history.

(56) References Cited

U.S. PATENT DOCUMENTS

| | | | |
|---|---|---|---|
| 4,226,793 A | 10/1980 | Kotzsch et al. | |
| 5,531,812 A * | 7/1996 | Montigny et al. | 106/2 |
| 5,591,818 A | 1/1997 | Standke et al. | |
| 5,629,400 A | 5/1997 | Standke et al. | |
| 5,679,147 A | 10/1997 | Standke et al. | |
| 5,808,125 A | 9/1998 | Standke et al. | |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,054,601 A | 4/2000 | Standke et al. | |
| 6,103,001 A | 8/2000 | Fisher et al. | |
| 6,118,015 A | 9/2000 | Haas et al. | |
| 6,133,466 A | 10/2000 | Edelmann et al. | |
| 6,139,622 A * | 10/2000 | Gobel et al. | 106/806 |
| 6,176,918 B1 | 1/2001 | Glausch et al. | |
| 6,177,582 B1 | 1/2001 | Jenkner et al. | |
| 6,228,936 B1 | 5/2001 | Standke et al. | |
| 6,251,989 B1 | 6/2001 | Edelmann et al. | |
| 6,255,513 B1 | 7/2001 | Standke et al. | |
| 6,288,256 B1 | 9/2001 | Standke et al. | |
| 6,361,871 B1 | 3/2002 | Jenkner et al. | |
| 6,395,858 B1 | 5/2002 | Mack et al. | |
| 6,403,228 B1 | 6/2002 | Mack et al. | |
| 6,491,838 B1 | 12/2002 | Standke et al. | |
| 6,534,667 B1 | 3/2003 | Standke et al. | |
| 6,641,870 B2 | 11/2003 | Bartkowiak et al. | |
| 6,685,766 B2 | 2/2004 | Standke et al. | |
| 6,713,186 B1 | 3/2004 | Jenkner et al. | |
| 6,767,982 B2 | 7/2004 | Standke et al. | |
| 6,770,327 B2 | 8/2004 | Edelmann et al. | |
| 6,841,197 B2 | 1/2005 | Standke et al. | |
| 7,578,877 B2 | 8/2009 | Giessler et al. | |
| 2003/0203117 A1 | 10/2003 | Bartkowiak et al. | |
| 2007/0110912 A1 | 5/2007 | Standke | |

(Continued)

FOREIGN PATENT DOCUMENTS

DE  198 14 267  4/1999

(Continued)

OTHER PUBLICATIONS

Saam et al., J. Polym. Sci.: Polym. Chem. Ed. (1982), 20, 3351-3368.*

*Primary Examiner*—Marc S Zimmer
(74) *Attorney, Agent, or Firm*—Oblon, Spivak, McClelland, Maier & Neustadt, L.L.P.

(57) ABSTRACT

High-viscosity aqueous emulsions of functional alkoxysilanes, condensed oligomers thereof, organopolysiloxanes, their preparation and use for the surface treatment of inorganic materials High-viscosity aqueous oil-in-water emulsion which comprises from 50 to 90% by weight, based on the total weight of the emulsion, of functional alkoxysilanes and/or condensed oligomers thereof and/or organoalkoxysiloxanes, at least one emulsifier and water and has a pH of from 5 to 9 and a mean droplet size of the disperse phase of less than 5 μm, wherein the width of the droplet size distribution, expressed as the span (see formula (I)), is >1.5, preferably from 3 to 8. The preparation of the emulsions having the desired droplet size distribution is carried out in apparatuses having at least one pressure stage at a pressure of from 2 to 15 MPa. The emulsion can be used for hydrophobicizing porous mineral building materials.

$$\frac{D90 - D10}{D50} \qquad (I)$$

26 Claims, No Drawings

U.S. PATENT DOCUMENTS

| | | |
|---|---|---|
| 2008/0027172 A1 * | 1/2008 | Gee et al. .................. 524/837 |
| 2008/0058489 A1 | 3/2008 | Edelmann et al. |
| 2008/0210130 A1 | 9/2008 | Giessler-Blank et al. |
| 2009/0011246 A1 | 1/2009 | Giessler-Blank et al. |
| 2009/0022898 A1 | 1/2009 | Standke et al. |

FOREIGN PATENT DOCUMENTS

| | | |
|---|---|---|
| EP | 0 340 816 | 11/1989 |
| EP | 0 616 989 | 9/1994 |
| EP | 0 776 873 | 6/1997 |

* cited by examiner

HIGH-VISCOSITY AQUEOUS EMULSIONS OF FUNCTIONAL ALKOXYSILANES, CONDENSED OLIGOMERS THEREOF, ORGANOPOLYSILOXANES, THEIR PREPARATION AND USE FOR SURFACE TREATMENT OF INORGANIC MATERIALS

The present invention relates to high-viscosity aqueous oil-in-water emulsions of functional alkoxysilanes, condensed oligomers thereof, organopolysiloxanes, the preparation of the emulsions in high-pressure emulsification apparatuses and their use for the surface treatment of inorganic materials, in particular for hydrophobicizing mineral building materials.

Aqueous emulsions of alkoxysilanes and organopolysiloxanes, their preparation and their use have been described in many publications.

EP-A 0 442 098 discloses a process for preparing transparent aqueous organopolysiloxane emulsions in which the mean particle size of the nonaqueous phase is less than 0.3 µm (preferably less than 0.1 µm). A concentrate is firstly prepared from liquid organopolysiloxanes, water and an emulsifier soluble in polyorganosiloxane by means of suitable turbulent mixing apparatuses under a pressure of from 0.01 to 1 MPa (HBS) and this is, in a second step, diluted with water to the desired concentration under comparable conditions and the pH of the emulsion is adjusted to 3-7 by addition of acid. The emulsions can be used, inter alia, as paints or impregnants for building materials.

U.S. Pat. No. 5,746,810 describes stable aqueous emulsions of alkylalkoxysilanes which have active contents of from 5 to 70% by weight and whose disperse phase has a droplet diameter of from 0.5 to 10 µm and which are suitable for making building materials water-repellent. The desired particle size is achieved by choice of the machine and its operating conditions for emulsification. It is possible to use, inter alia, commercial high-pressure homogenizers.

U.S. Pat. No. 6,103,001 and WO 00/3406 describe stable aqueous emulsions of alkoxysilanes, alkylalkoxysilanes having an active content of from 1 to 65% by weight as hydrophobicizing agents for wood and building materials. The emulsions have a viscosity of from >5 to 1000 mm$^2$/second and a particle size of the disperse phase of less than 10 µm, preferably less than 1 µm, very particularly preferably less than 0.5 µm or from 0.276 µm to 0.924 µm. The emulsions comprise, in addition to water and the alkoxysilanes, an emulsifier system comprising at least two emulsifiers having different HLB values. The particle size is set by preemulsifying the constituents and subsequently passing them through a two-stage pressure homogenizer at pressures of 52 MPa/16 MPa.

EP-A 0 761 724 discloses the continuous preparation of aqueous organopolysiloxane emulsions by passing them one or more times through two-stage homogenizers at shear rates of at least 100 seconds$^{-1}$, preferably from 10 000 to 300 000 seconds$^{-1}$, under pressures of from 0.98 to 1.37 bar. The mean particle size is 0.3 µm or 0.4 µm. A paste-like emulsion was prepared from a dimethylpolysiloxane having terminal trimethylsiloxy groups and polyoxyethylene lauryl ether and cetyltriammonium chloride as emulsifiers.

EP-A 0 538 555 pertains to aqueous emulsions comprising organosilicon compounds for the impregnation of inorganic materials, in particular building materials. The emulsions comprise water, at least one alkoxysilane and, if appropriate, oligomers thereof, one or more anionic surfactants and silicon-functional surfactants and customary auxiliaries. Stable emulsions are obtained by use of high-pressure homogenizers with two passes at pressures of from 8 to 50 MPa and from 10 to 70 MPa, with the pressure drop in the second pressure stage being 20%. Droplet sizes of <1 µm are achieved.

EP-A 0 616 989 describes hydrophobicizing aqueous impregnation emulsions for mineral building materials. These comprise organosilanes and/or organosiloxane resins having reactive groups. The disperse phase has a mean particle size of from 0.55 to 1.1 µm and a width of the particle size distribution of less than 1.3. The particle size distribution is set in jet dispersers or high-pressure homogenizers in which a preemulsion is pushed through a nozzle under high pressure. Here, it is necessary to push the emulsion through the nozzle a number of times or to use apparatuses which have a plurality of nozzles arranged in series.

EP-A 0 819 665 discloses aqueous pastes of organosilicon compounds which comprise $C_8$-$C_{20}$-alkylsilanes, $C_2$-$C_6$-alkoxysilanes and/or organopolysiloxanes containing alkoxy groups and, if appropriate, alkoxysilanes or organopolysiloxanes containing aminoalkyl groups, emulsifier and water for the hydrophobicization of building materials. Pressure emulsification machines, colloid mills or high-speed stator-rotor stirring apparatuses are used for preparing them.

The paste-like aqueous emulsions of organosilicon compounds described in WO 00/46167 differ from those known from EP-A 0 819 665 only in that organic solvents which are immiscible with water are present.

According to the literature, it is believed that particularly fine emulsions having a narrow particle size distribution are more stable toward coagulation or segregation and this has a positive effect on the penetration behavior into porous materials.

It is an object of the present invention to provide aqueous emulsions of functional alkoxysilanes, condensed oligomers thereof and organoalkoxysiloxanes which are suitable for the surface treatment of inorganic materials and are sufficiently storage-stable but break on the contact surfaces on application to surfaces to be treated and set free a thin film of the dispersed oil phase.

This object is achieved by high-viscosity aqueous oil-in-water emulsions which comprise from 50 to 90% by weight, based on the total weight of the emulsion, of functional alkoxysilanes and/or condensed oligomers thereof and/or organoalkoxysiloxanes, at least one emulsifier and water and have a pH of from 5 to 12, preferably from 6 to 11, particularly preferably from 7 to 8.5, and a mean droplet size of the disperse phase of less than 5 µm, wherein the width of the droplet size distribution, expressed as the span $$\frac{D90 - D10}{D50}, \text{ is} > 1.5.$$

The achievement of the object of the invention also encompasses a process for preparing high-viscosity aqueous oil-in-water emulsions comprising functional alkoxysilanes and/or condensed oligomers thereof and/or organoalkoxysiloxanes, at least one emulsifier and water by (i) premixing the constituents and (ii) emulsifying the mixture in a high-pressure homogenizer having at least one pressure stage and a pressure of from 2 to 15 MPa, so that the mean droplet size is less than 5 µm and the width of the droplet size distribution, expressed as the span $$\frac{D90 - D10}{D50}, \text{ is} > 1.5.$$

The aqueous high-viscosity emulsions of the invention which have been prepared by the above-described process are preferably used for hydrophobicizing porous mineral building materials such as concrete, clay bricks and lime-sand brick.

For the purposes of the present invention, the mean droplet diameter is the calculated volume average diameter of a droplet given by dividing the total volume of all droplets of the emulsion by the number of droplets.

The numerical value for the width of the droplet size distribution is determined so that, of the given quantity of droplets, the droplets having the smallest diameters up to an amount of 10% by weight of the droplets (D10) and the droplets having the largest diameters up to an amount of 10% by weight (D90) are disregarded and the difference between the diameters of the remaining largest droplet and the remaining smallest droplet is divided by the diameter of that droplet (D50) which is larger than 50% by weight of all droplets and smaller than 50% by weight of all droplets. This numerical value for the width of the distribution [(D90−D10)/D50)] will for the purposes of the invention be referred to as the span.

The droplet diameter and the width of the distribution can be determined using a Coulter® LS particle size analyzer, with, if necessary, the droplet size distribution being depicted graphically by plotting the percentage by volume of the droplets against the droplet diameter (this preferably on a logarithmic scale).

In the case of a monomodal distribution, the curve has one maximum, and in the case of a bimodal distribution it has two maxima.

If the position of the maximum of such a distribution curve is reported in the following in μm, this reported value relates in the case of a bimodal or multimodal distribution to the first maximum having the smallest droplet diameter.

Surprisingly, it has been found that although the storage stability is a feature corresponding to market requirements in the hydrophobicization of porous mineral building materials, the penetration behaviour of the active hydrophobicizing ingredient and not of the emulsion is an important feature for the desired hydrophobicization of the surface region of the porous building material. It has been found to be particularly advantageous for penetration of the aqueous phase of the emulsion into the pores to reduced or substantially prevented.

Without wishing to be tied to a particular theory, it is assumed that this is achieved according to the invention by the storage stability of the aqueous emulsions meeting the requirements of the market in terms of time, but the emulsion being unstable insofar as it breaks on the contact surface on application to porous, mineral building materials which preferably have an alkali pH of ≧9, more preferably >11, particularly preferably >12, and sets free a thin film of the dispersed oil phase from which the active ingredient diffuses into the pores and the film largely suppresses direct penetration of aqueous phase of the emulsion.

This relative instability is achieved according to the invention by the width of the droplet distribution of the emulsion, with this behavior being able to be additionally aided by choice of the emulsifier system.

In contrast to the prior art, aqueous emulsions having a greater width of the droplet size distribution than that described in the prior art can also be used readily according to the invention.

The span is preferably above 2, particularly preferably from 3 to 8 and very particularly preferably from 4 to 7.

The droplet size distribution is achieved by use of selected emulsification conditions and apparatuses. Jet dispersers or high-pressure homogenizers as described, for example, in EP-A 0 101 007 or EP-A 0 761 724 have been found to be particularly useful. Such homogenizers are obtainable, for example, from APV Gaulin GmbH, Lübeck. In these apparatuses, the setting and reporting of the pressure involves mechanical setting of the width of the nozzles or the nozzle gap.

Preference is given to using a pressure of from 4 to 8 MPa, very particularly preferably from 5 to 6 MPa, in at least one pressure stage.

The emulsification in (ii) can be carried out using two pressure stages having different pressures.

In an embodiment of the process of the invention, a preemulsification (iii) is additionally carried out in the high-pressure homogenizer having at least one pressure stage under a pressure of from 10 to 70 MPa, preferably from 20 to 40 MPa, after the premixing step (i) and before the emulsification step (ii).

After leaving the high-pressure homogenizer, the emulsions can be cooled, or precooled mixtures can also be emulsified.

The silanes are selected from among alkoxysilanes or mixtures of the formulae

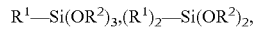

where the radicals $R^1$ are identical or different and are each $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane and $R^2$ is an alkyl radical having from 1 to 6 carbon atoms, preferably 1 or 2 carbon atoms.

Examples which may be mentioned are methyltrimethoxysilane, methyltriethoxysilane, ethyltrimethoxysilane, ethyltriethoxysilane, n- and i-propyl-trimethoxysilane, n- and i-propyltriethoxysilane, n- and i-butyltrimethoxysilane, n- and i-butyltriethoxysilane, n- and i-pentyltrimethoxysilane, n- and i-pentyltriethoxysilane, n- and i-hexyltrimethoxysilane, n- and i-octyltrimethoxysilane, n- and i-octyltriethoxysilane, hexadecyltrimethoxysilane, hexadecyltriethoxysilane, octadecyltrimethoxysilane, octadecyltriethoxysilane, dimethyldimethoxysilane, dimethyldiethoxysilane, n- and i-butylmethyldiethoxysilane, n- and i-butylmethyldiethoxysilane, cyclohexylmethyldimethoxysilane, diisopropyldimethoxysilane, diisobutyldimethoxysilane, isobutyl-isopropyldimethoxysilane, vinyltrimethoxysilane, vinyltriethoxysilane, vinyltris(2-methoxyethoxysilane), 3-aminopropyltrimethoxysilane, 3-aminopropyl-triethoxysilane, N-(n-butyl)-3-aminopropyltrimethoxysilane, 3-aminopropylmethyldiethoxysilane, 3-ureidopropyltrimethoxysilane, 3-ureidopropyltriethoxysilane, N-aminoethyl-3-aminopropyltrimethoxysilane, N-aminoethyl-3-aminopropyltriethoxysilane, triamino-functional propyltrimethoxysilane, 3-(4,5-dihydroimidazolyl)propyltriethoxysilane, 3-glycidyloxypropyltrimethoxysilane, 3-glycidyloxypropyltriethoxysilane, tridecafluorooctyltriethoxysilane, tridecafluorooctyltrimethoxysilane, acryloxypropyltrimethoxysilane, acryloxypropyltriethoxysilane, 3-methacryloxypropyltrimethoxysilane, 3-methacryloxypropyltriethoxysilane, 3-methacryloxy-2-methylpropyltrimethoxysilane, 3-methacryloxy-2-methylpropyltriethoxysilane, mercaptopropyltrimethoxysilane, mercaptopropyltriethoxysilane, bis(triethoxysilylpropyl)tetrasulfane, bis(trimethoxysilylpropyl)tetrasulfane, bis(triethoxysilylpropyl)disulfane, bis(trimethoxysilylpropyl)disulfane, bis(triethoxysilyl-propyl)sulfane, bis(trimethoxysilylpropyl)sulfane, bis(triethoxysilylpropyl)pentasulfane, bis(trimethoxysilylpropyl)pentasulfane.

When sole use is made of functional alkoxysilanes or mixtures thereof, preference is given to using ones whose flash point is above 55° C., particularly preferably above 100° C.

In place of or together with functional alkoxysilanes, it is also possible to use oligomers thereof for the oil phase. These oligomers, also referred to as homooligomers, are selected from among oligomers or oligomer mixtures of the formula

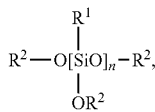

where $R^1$ is $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, the groups $R^2$ are identical or different and are each a hydrogen atom or an alkyl radical having from 1 to 6 carbon atoms, preferably 1 or 2 carbon atoms, and n determines the degree of oligomerization and has a value of from 2 to 40, preferably from 2 to 20, particularly preferably from 3 to 6. These are oligomer mixtures having a mean degree of oligomerization of from 3 to 20, preferably from 4 to 6. The oligomers can be in linear, cyclic and/or branched form.

Preferred examples of oligomers are those having the radicals:
$R^1$=$CH_3$—, $C_2H_5$—, $C_3H_7$—, i-$C_4H_9$—, $C_6H_{13}$—, i-$C_6H_{13}$—, $C_8H_{16}$—, i-$C_8H_{16}$—, $CH_2$=CH—, methacryloxypropyl, glycidyloxypropyl, aminopropyl, aminoethylaminopropyl, triethyleneaminopropyl, mercaptopropyl and
$R^2$=methyl or ethyl.

In the case of mixtures of functional alkoxysilanes with oligomers thereof, the proportion of the oligomers can be up to 20% by weight, preferably up to 10% by weight, based on the total weight of the oil phase of the mixture.

Emulsions comprising functional alkoxysilanes without oligomers or with a proportion of oligomers of up to 20% by weight, based on the total weight of the oil phase of the mixture, are particularly advantageous when the position of the maximum of the droplet size distribution is below 1 μm, the D90 is below 3 μm, the mean droplet size (D50) is greater than the position of the maximum of the droplet size distribution but is always below 0.5 μm.

Emulsions comprising functional alkoxysilanes and oligomers thereof and having an alkoxysilane content of up to 20% by weight, preferably up to 10% by weight, based on the total weight of the oil phase of the mixture, comprising functional alkoxysilanes and oligomers thereof, are particularly advantageous when the position of the maximum of the droplet size distribution is below 5 μm, the D90 is below 7 μm and the mean droplet size (D50) is above 0.5 μm but can in each case be greater than or smaller than the droplet size corresponding to the position of the maximum of the droplet size distribution.

The organoalkoxysiloxanes, hereinafter also referred to as cooligomers, are organoalkoxysiloxanes or mixtures of the formula

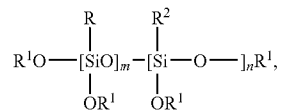

where m and n are identical or different and are each from 0 to 20, with the proviso that (n+m)≧2, R and $R^2$ are identical or different and are each hydrogen (H), $C_1$-$C_{18}$-alkyl, halogen- or amino-substituted $C_1$-$C_{18}$-alkyl, phenyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, the groups $R^1$ are identical or different and are each a hydrogen atom or an alkyl radical having from 1 to 6 carbon atoms, preferably 1 or 2 carbon atoms. Such organosiloxanes, too, can be in the form of linear, cyclic and/or branched units.

Examples of mixed oligomers are (n+m meets the same criteria given above under n on page 10 for the homooligomers):
$R^1$: methyl or ethyl or H,
R: $C_3H_7$—, $R^2$: $CH_2$=CH—,
R: mercaptopropyl, $R^2$: propyl,
R: methyl, $R^2$: aminopropyl or aminoethylaminopropyl or ethylenetriaminopropyl,
R: propyl, $R^2$: aminopropyl or aminoethylaminopropyl or ethylenetriaminopropyl,
R: i-butyl, $R^2$: aminopropyl or aminoethylaminopropyl or ethylenetriaminopropyl,
R: octyl, $R^2$: aminopropyl or aminoethylaminopropyl or ethylenetriaminopropyl,
R: i-octyl, $R^2$: aminopropyl or aminoethylaminopropyl or ethylenetriaminopropyl,
R: tridecafluorooctyl, $R^2$: aminopropyl or aminoethylaminopropyl or ethylenetriaminopropyl,
R: methacryloxypropyl, $R^2$: aminopropyl or aminoethylaminopropyl or ethylenetriaminopropyl,
R: glycidoxypropyl, $R^2$: aminopropyl or aminoethylaminopropyl or ethylenetriaminopropyl.

These can, owing to their method of preparation, still contain a small but measurable proportion of the organoalkoxysilanes used in each case. However, the proportion should not exceed 10% by weight, based on the total weight of the mixture.

Emulsions comprising these organoalkoxysilanes are particularly advantageous when the position of the maximum of the droplet size distribution is below 5 μm, preferably below 1 μm, and the D90 is <7 μm, preferably, <3 μm.

The content of silane, oligomer or siloxane in the oil phase can also advantageously be adjusted by addition of a suitable organic solvent, for example, but not exclusively, aliphatic and aromatic hydrocarbons having a boiling point above room temperature, e.g. $C_6$-$C_{12}$-alkanes, petroleum spirit, naphtha, diesel, kerosene, toluene, xylene, alcohols or polyols such as pentanol, hexanol, octanol, nonanol, isononanol, glycerol, ethers, esters, aldehydes, ketones or a mixture of at least two of the above-mentioned organic solvents.

The high-viscosity emulsions of the invention comprise at least one emulsifier, preferably an emulsifier system composed of two or more emulsifiers.

The emulsifier or emulsifiers can be present in amounts of from 0.01 to 5% by weight, based on the total weight of the emulsion.

Suitable emulsifiers are selected, for example, from among alkylsulfates having a $C_8$-$C_{18}$-alkyl radical, alkyl ether sulfates and alkaryl ether sulfates having a $C_8$-$C_{18}$-alkyl radical as hydrophobic radical and from 1 to 40 ethylene oxide (EO) or propylene oxide (PO) units, alkylsulfonates having a $C_8$-$C_{18}$-alkyl radical, alkarylsulfonates having a $C_8$-$C_{18}$-alkyl radical, monoesters of sulfosuccinic acid with monohydric alcohols or alkylphenols having from 5 to 15 carbon atoms, alkali metal and ammonium salts of carboxylic acids having from 8 to 20 carbon atoms in the alkyl, aryl, alkaryl or aralkyl radical, alkylphosphates and alkarylphosphates having from 8 to 20 carbon atoms in the organic radical, alkyl ether phosphates or alkaryl ether phosphates having from 8 to 20 carbon atoms in the alkyl or alkaryl radical and from 1 to 40 EO units, alkyl polyglycol ethers and alkaryl polyglycol ethers having from 8 to 40 EO units and from 8 to 20 carbon atoms in the alkyl or aryl radicals, ethylene oxide-propylene oxide (EO-PO) block copolymers having from 8 to 40 EO and PO units, addition products of alkylamines having $C_8$-$C_{22}$-alkyl radicals with ethylene oxide or propylene oxide, alkyl polyglycosides having linear or branched, saturated or unsaturated $C_8$-$C_{24}$-alkyl radicals and oligoglycoside radicals having from 1 to 10 hexose or pentose units, silicon-functional surfactants or mixtures of these emulsifiers. Particularly useful emulsifiers are silicon-functional surfactants of the general formulae

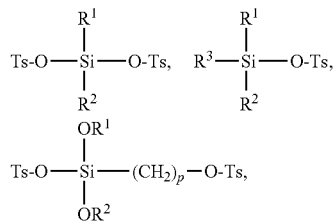

where $R^1$ and $R^2$ are identical or different and are each straight-chain or branched $C_1$-$C_{20}$-alkyl, preferably $C_1$-$C_{10}$-alkyl, or phenyl, $R^3$ is $C_1$-$C_{10}$-alkyl, p is an integer from 0 to 3 and Ts is a surfactant radical selected from among

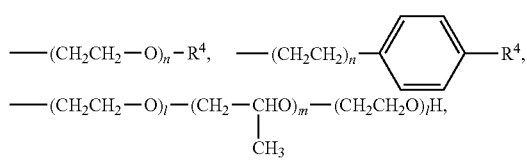

where n is an integer from 3 to 15, m is an integer from 3 to 50 and l is an integer from 3 to 25, $R^4$ is H, $C_1$-$C_{20}$-alkyl, $C_2$-$C_{36}$-alkenyl, $C_5$-$C_8$-cycloalkyl, $C_7$-$C_{36}$-aralkyl.

Particular preference is given to a combination of alkylsulfates having $C_8$-$C_{18}$-alkyl radicals and silicon-functional surfactants of the formula

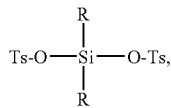

where R is methyl, ethyl, methoxy or ethoxy and the surfactant radical is

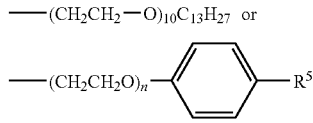

where, in the formula, n is an integer from 5 to 15 and $R^5$ is a straight-chain or branched $C_6$-$C_{10}$-alkyl radical.

A surfactant of the above formulae in which R=$CH_3$, n=1 to 30, in particular from 4 to 6, and $R^5$=isononyl is particularly suitable. This surfactant will hereinafter be referred to as surfactant A.

In addition to the hydrophobicizing active ingredient(s), water and the at least one emulsifier, the high-viscosity aqueous emulsions of the invention can further comprise customary auxiliaries selected from among inorganic and organic acids, buffer substances, fungicides, bactericides, algaecides, microbicides, fragrances, corrosion inhibitors, preservatives, rheological auxiliaries such as pyrogenic silica or bentonites, water repellents such as fluoropolymers, hydrophobic pyrogenic silicas, silicone resins, catalysts such as organic tin, titanium or zirconium compounds, e.g. dibutyltin dilaurate, titanium alkoxides or zirconium alkoxides (e.g. tetrabutyl titanate).

The desired pH can be set by addition of acid or of alkali compounds or by means of customary buffer systems, e.g. $NaHCO_3$, sodium acetate/acetic acid or alkali metal phosphates.

The exact determination of the viscosity of the emulsions of the invention is difficult because of their non-Newtonian flow behavior. However, guide values can be determined by means of a rotational viscometer at room temperature (20° C.) using particular spindles and an appropriately low speed of rotation.

The viscosity determined in this way is above 1000 mPa·s, preferably above 5000 mPa·s.

The invention is illustrated by the following examples which do not, however, restrict the scope of the invention.

EXAMPLE 1

Composition of the aqueous emulsion:

3.42 kg of octyltriethoxysilane (purity >99%), 0.38 kg of octylethoxysiloxane mixture (oligomer of the formula on page 9), 1.5 kg of water, 0.8 kg of emulsifier system comprising an anionic emulsifier having an HLB of 40 (sodium laurylsulfate) and silicon surfactant type A 0.08 kg of preservative, mixture of CIT/MIT*), 0.04 kg of $NaHCO_3$

*) CIT=chloromethylisothiazolinone; MIT=methylisothiazolinone.

The constituents were premixed by stirring the oil phase into the aqueous phase by means of a stirrer and were subsequently preemulsified in a high-pressure homogenizer having one pressure stage at a pressure of 30 MPa for about 8 minutes and subsequently emulsified using two pressure stages (1st pressure stage 3 MPa, 2nd pressure stage 6 MPa) for about 15 minutes.

The firm paste formed had a viscosity of 126 000 MPa·s (measured using a rotational viscometer at 20° C., spindle 4, 1 rpm).

The particle size distribution was as follows:

D90-2.1 μm; D50=0.42 μm; D10=0.10 μm;

mean particle size=0.93 μm, maximum of the distribution at 0.32 μm, span=4.8. The paste was visually unchanged after storage for 65 days both at room temperature and at 60° C.

EXAMPLE 2

Example 1 was repeated using the same composition under altered emulsification conditions.

After premixing, emulsification was carried out immediately using one pressure stage (6 MPa).

The firm paste formed had the following particle size distribution:

D90=2.41 μm; D50=0.37 μm; D10=0.11 μm;

mean particle size=1.0 μm, maximum of the distribution at 0.3 μm, span=6.2.

The thick paste had the same storage stability as the paste of Example 1.

EXAMPLE 3

Example 1 was repeated using the same composition under altered emulsification conditions. After premixing, emulsification was carried out immediately using one pressure stage (2 MPa).

The paste formed had the following particle size distribution:

D90=1.88 μm; D50=0.52 μm; D10=0.13 μm;

mean particle size=0.82 μm, maximum of the distribution at 0.47 μm, span=3.35.

COMPARATIVE EXAMPLE 1

Example 1 was repeated using altered emulsification conditions. After premixing, emulsification was carried out immediately using one pressure stage (20 MPa).

The viscose but still liquid emulsion formed had the following particle size distribution: bimodal distribution:

D90=6.67 μm; D50=1.03 μm; D10=0.14 μm;

mean particle size=2.38 μm

Position of the first maximum at 0.3 μm and position of the second maximum at 4 μm; span=6.3.

EXAMPLE 4

Composition of the emulsion:

3.2 kg of oligomer mixture of n-propylethoxysiloxanes having a degree of oligomerization of from 2 to 6, 0.73 kg of water, 0.64 kg of emulsifier system comprising sodium laurylsulfate ($C_{12}$-$C_{16}$) and silicon surfactant type A 0.06 kg of preservative, mixture of CIT/MIT, 0.03 kg of $NaHCO_3$ The constituents were premixed by stirring the oil phase into the aqueous phase by means of a stirrer and were subsequently preemulsified in a high-pressure homogenizer having one pressure stage at a pressure of 30 MPa for about 8 minutes and subsequently emulsified using two pressure stages (1st pressure stage 3 MPa, 2nd pressure stage 6 MPa). A number of batches were prepared using emulsification times ranging from 12 to 20 minutes.

The firm pastes formed had a viscosity of 145 000 mPa·s (measured using a rotary viscometer at 20° C., spindle 4, 1 rpm).

The batches had the following droplet size distributions:

D90=4.86 μm; D50=0.77 μm; D10=0.15 μm

D90=5.57 μm; D50=1.11 μm; D10=0.16 μm

The mean droplet size was 1.76 μm and 2.80 μm, respectively;

the maximum of the distribution was at 0.63 μm and 2.53 μm, respectively; the spans were 6.1 and 4.9.

D90=5.92 μm; D50=0.99 μm and D10=0.16 μm

D90=4.38 μm; D50=0.59 μm and D10=0.13 μm

The mean droplet size was 2.21 μm and 1.55 μm, respectively;

the maximum of the distribution was at 0.39 μm; the spans were 7.2.

D90=5.54 μm; D50=0.93 μm; D10=0.16 μm the mean droplet size was 1.99 μm;

the maximum of the distribution was at 0.57 μm; the span was 5.8.

Testing of the penetration behavior of the high-viscosity emulsions according to the invention in comparison with commercial liquid emulsions:

The penetration depth of the active component into the test specimen after treatment with emulsions was determined in each case. The penetration depth was critical to a good and long-lasting effectiveness of hydrophobicization methods. Penetration depths of 1 mm or less were not acceptable. A very high penetration depth was desired. Penetration depths in the range >4 mm were optimal.

The application of the emulsions was carried out as follows:

in the case of the liquid comparative emulsions, the respective test specimen was dipped twice into the impregnation liquid so that it was fully immersed for 5 seconds each time, with a time of 1 minute between the immersions. The amount of impregnation liquid consumed was determined by difference weighing. This dipping procedure simulated to a good approximation the spray application by means of airless equipment which is customary in practice (one application). Higher applied amounts could be achieved only by means of multiple application (two or more spray applications with corresponding additional work). The amounts consumed reported in the table thus indicate the applied amounts which are achievable in one application in practice.

The high-viscosity emulsions had to be applied in a different way, since the dipping method gave applied amounts which were much too high, did not correspond to normal practice and were nonuniform. The test specimens were therefore provided with a controlled layer thickness of the high-viscosity emulsion by airless spray methods, by doctor blade coating, brushing or spatula coating. Readily controllable layer thicknesses of from 0.2 to 0.3 mm were applied, corresponding to a product consumption of from 200 to 300 g/m².

After a reaction time of 14 days, the test specimens were split and the penetration depth of the hydrophobicizing material was determined by wetting the fresh fracture surface with water. Impregnated, hydrophobic regions were not wetted by water.

The penetration depth of the active component and the reduction in the water absorption of the test specimen after treatment with emulsions was in each case determined in comparison with untreated test specimens. Test specimens made of concrete (C) and of lime-sand brick (LSB) were used. Commercial hydrophobicizing emulsions having active contents of 10, 20 and 40% were used for comparison.

Comparative emulsion A: Enviroseal® 20 (contains 20% of active component, basis: ethyltriethoxysilane)

Comparative emulsion B: Enviroseal® 40 (contains 40% of active component, basis: octyltriethoxysilane)

Comparative emulsion C: Baysilone WB 40% (original emulsion contains 58% of active component based on silicone, diluted with water to an active content of 40%)

Comparative emulsion D: Baysilone WB 10% (as C, only with an active content of 10%).

Emulsion According to the Invention from Example 1

Emulsion According to the Invention from Example 4

TABLE

| Test specimen | Impregnant | Applied amount in g/m² | Depth of penetration in mm |
|---|---|---|---|
| LSB | A | 227 | 1.5 |
| LSB | B | 256 | 3.4 |
| LSB | C | 197 | 0.7 |
| LSB | Example 1 | 293 | 4.9 |
| LSB | Example 4 | 284 | 4.6 |
| C | A | 120 | 1.0 |
| C | B | 160 | 1.0 |
| C | C | 80 | 0.5 |
| C | Example 1 | 200 | 4.5 |
| C | Example 4 | 213 | 4.7 |

The above comparative study shows that the high-viscosity, aqueous emulsions according to the invention display considerably greater penetration depths than do commercial, low-viscosity emulsions when applied in an appropriate manner and in amounts which can be achieved in practice in a single application.

It is particularly worthy of mention and unexpected that the emulsion according to the invention based on pure, oligomeric alkylsiloxane (Example 4) achieves penetration depths as can only be achieved using monomeric alkyltrialkoxysilanes (comparison of Example 1 and Example 4). This refutes the industrial belief that good penetration depths can only be achieved on dense substrates such as concrete when using monomeric alkyltrialkoxysilanes as active substance. The industrial opinion expressed above applies in any case to silicone resins as active component (Baysilone WB) [comparison of comparative emulsion C (Baysilone WB 40%) with Example 1)]

A further advantage of the emulsions of the invention compared to the prior art was the improved flash point behavior. Alkyltrialkoxysilane emulsions displayed an alcohol content with increasing storage time, due to hydrolysis of the active ingredient. The alcohols formed were in general methanol or ethanol. Both substances can dramatically reduce the flash point of the emulsions in question. Thus, the comparative emulsion A (Enviroseal 20) displayed a flash point of 59° C. after storage for a few months, and that comprising Baysilone WB (58% active content) had a flash point of only 26° C., while the emulsions from Examples 1 and 4 under the same storage conditions displayed a flash point of >75° C. and were thus classified nonflammable liquids.

EXAMPLE 5

Paste comprising cooligomeric siloxane mixture corresponding to claim 5:

Composition of the emulsion:

3.2 kg of DYNASYLAN 6598

0.73 kg of water 0.64 kg of emulsifier system comprising sodium laurylsulfate ($C_{12}$-$C_{16}$) and surfactant A 0.06 kg of preservative, mixture of CIT/MIT 0.03 kg of $NaHCO_3$ The constituents were premixed by stirring the oil phase into the aqueous phase by means of a stirrer and were subsequently preemulsified in a high-pressure homogenizer having one pressure stage at a pressure of 30 MPa for about 8 minutes and subsequently emulsified using two pressure stages (1st pressure stage 3 MPa, 2nd pressure stage 6 MPa). A number of batches were prepared using emulsification times ranging from 12 to 20 minutes.

The paste formed had a viscosity of 5000 mPa·s (rotary viscometer at 20° C., spindle 4, 1 revolution per minute).

Droplet size distribution: D90: 6 μm, D50: 0.9 μm, D10: 0.15 μm.

Span=6.5.

DYNASYLAN® 6598 is a cooligomer which is commercially available from Degussa and in which R=$CH_2$=CH—, $R^2$=$C_3H_7$—, $R^1$=$C_2H_5$, m=n, mean m+n=4.

The invention claimed is:

1. A high-viscosity aqueous oil-in-water emulsion which comprises from 50 to 90% by weight, based on the total weight of the emulsion, of functional alkoxysilanes and/or condensed oligomers thereof and/or organoalkoxysiloxanes, at least one emulsifier and water and has a pH of from 5 to 9 and a mean droplet size of the disperse phase of less than 5 μm, wherein the width of the droplet size distribution, expressed as the span $$\frac{D90 - D10}{D50}, \text{ is} > 3.$$

2. The high-viscosity emulsion as claimed in claim 1, wherein the span is from 3 to 8.

3. The high-viscosity emulsion as claimed in claim 1, wherein the functional alkoxysilanes are selected from among alkoxysilanes or mixtures of the formulae $$R^1—Si(OR^2)_3, (R^1)_2—Si(OR^2)_2,$$

where the radicals $R^1$ are identical or different and are each $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane and $R^2$ is an alkyl radical having from 1 to 6 carbon atoms.

4. The high-viscosity emulsion as claimed in claim 1, wherein the condensed oligomers of the functional alkoxysilanes are selected from among alkoxysilanes or mixtures of the formula

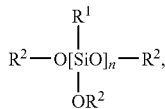

where $R^1$ is $C_3$-$C_{18}$-alkyl, halogen- or amino-substituted $C_3$-$C_{18}$-alkyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, the groups $R^2$ are identical or different and are each a hydrogen atom or an alkyl radical having from 1 to 6 carbon atoms, and n determines the degree of oligomerization and has a value of from 2 to 40.

5. The high-viscosity emulsion as claimed in claim 1, wherein the organoalkoxysiloxanes are selected from among organoalkoxysiloxanes or mixtures of the formula

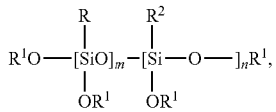

where m and n are identical or different and are each from 0 to 20, with the proviso that (n+m)>2, R and $R^2$ are identical or different and are each hydrogen, $C_1$-$C_{18}$-alkyl, halogen- or amino-substituted $C_1$-$C_{18}$-alkyl, phenyl, vinyl, mercaptoalkyl, methacryloxyalkyl, acryloxyalkyl, alkylaminoalkyl, dialkylaminoalkyl, diethyleneaminoalkyl, triethyleneaminoalkyl, glycidyloxyalkyl, bisalkoxysilylalkyl, monosulfane or polysulfane, the groups $R^1$ are identical or different and are each a hydrogen atom or an alkyl radical having from 1 to 6 carbon atoms.

6. The high-viscosity aqueous emulsion as claimed in claim 1, wherein the at least one emulsifier is selected from among alkylsulfates having a $C_8$-$C_{18}$-alkyl radical, alkyl ether sulfates and alkaryl ether sulfates having a $C_8$-$C_{18}$-alkyl radical as hydrophobic radical and from 1 to 40 ethylene oxide (EO) or propylene oxide (PO) units, alkylsulfonates having a $C_8$-$C_{18}$-alkyl radical, alkarylsulfonates having a $C_8$-$C_{18}$-alkyl radical, monoesters of sulfosuccinic acid with monohydric alcohols or alkylphenols having from 5 to 15 carbon atoms, alkali metal and ammonium salts of carboxylic acids having from 8 to 20 carbon atoms in the alkyl, aryl, alkaryl or aralkyl radical, alkylphosphates and alkarylphosphates having from 8 to 20 carbon atoms in the organic radical, alkyl ether phosphates or alkaryl ether phosphates having from 8 to 20 carbon atoms in the alkyl or alkaryl radical and from 1 to 40 EO units, alkyl polyglycol ethers and alkaryl polyglycol ethers having from 8 to 40 EO units and from 8 to 20 carbon atoms in the alkyl or aryl radicals, ethylene oxide-propylene oxide (EO-PO) block copolymers having from 8 to 40 EO and PO units, addition products of alkylamines having $C_8$-$C_{22}$-alkyl radicals with ethylene oxide or propylene oxide, alkyl polyglycosides having linear or branched, saturated or unsaturated $C_8$-$C_{24}$-alkyl radicals and oligoglycoside radicals having from 1 to 10 hexose or pentose units, silicon-functional surfactants or mixtures of these emulsifiers.

7. The high-viscosity aqueous emulsion as claimed in claim 6, wherein the at least one emulsifier is present in an amount of from 0.01 to 5% by weight, based on the total weight of the emulsion.

8. The high-viscosity aqueous emulsion as claimed in claim 1 which further comprises customary auxiliaries selected from among inorganic or organic acids, buffer substances, fungicides, bactericides, algaecides, microbicides, fragrances, corrosion inhibitors, preservatives, rheological auxiliaries, water repellents, catalysts.

9. A process for preparing high-viscosity aqueous oil-in-water emulsions comprising functional alkoxysilanes and/or condensed oligomers thereof and/or organoalkoxysiloxanes, at least one emulsifier and water comprising (i) premixing the constituents and (ii) emulsifying the mixture in a high-pressure homogenizer having at least one pressure stage and a pressure of from 2 to 15 MPa, so that the mean droplet size is less than 5 μm, wherein the width of the droplet size distribution, expressed as the span $$\frac{D90 - D10}{D50}, \text{ is} > 3.$$

10. The process as claimed in claim 9, wherein the pressure in at least one pressure stage is from 4 to 8 MPa.

11. The process as claimed in claim 9, wherein a pre-emulsifying (iii) is additionally carried out in the high-pressure homogenizer having at least one pressure stage under a pressure of from 10 to 70 MPa after said premixing (i) and before said emulsifying (ii).

12. The process as claimed in claim 9, wherein said emulsifying (ii) is carried out using 2 pressure stages having different pressures.

13. The process as claimed in claim 9, wherein the emulsion is cooled on leaving the high-pressure homogenizer.

14. A high-viscosity aqueous oil-in-water emulsion produced by the process of claim 9.

15. A process for hydrophobicizing a porous mineral building material comprising applying the emulsion of claim 1 to said porous mineral building material.

16. The high-viscosity emulsion as claimed in claim 2, wherein the span is from 4 to 7.

17. The high-viscosity emulsion as claimed in claim 3, wherein $R^2$ is an alkyl radical having 1 or 2 carbon atoms.

18. The high-viscosity emulsion as claimed in claim 4, wherein the groups $R^2$ are identical or different and are each a hydrogen atom or an alkyl radical having 1 or 2 carbon atoms.

19. The high-viscosity emulsion as claimed in claim 5, wherein the groups $R^1$ are identical or different and are each a hydrogen atom or an alkyl radical having 1 or 2 carbon atoms.

20. A process for preparing high-viscosity aqueous oil-in-water emulsions comprising functional alkoxysilanes and/or condensed oligomers thereof and/or organoalkoxy-siloxanes, at least one emulsifier and water comprising (i) premixing the constituents and (ii) emulsifying the mixture in a high-pressure homogenizer having at least one pressure stage and a pressure of from 4 to 8 MPa, so that the mean droplet size is less than 5 μm, wherein the width of the droplet size distribution, expressed as the span $$\frac{D90-D10}{D50}, \text{is} > 1.5.$$

21. The process as claimed in claim 11, wherein the pressure is from 20 to 40 MPa.

22. The process as claimed in claim 15, wherein said applying includes dipping, spraying, blade coating, brush coating, spatula coating, and combinations thereof.

23. The process as claimed in claim 15, wherein said porous mineral building material includes concrete, limestone, lime-sand brick, and clay brick.

24. The process as claimed in claim 20, wherein the pressure in at least one pressure stage is from 5 to 6 MPa.

25. A process for preparing high-viscosity aqueous oil-in-water emulsions comprising functional alkoxysilanes and/or condensed oligomers thereof and/or organoalkoxy-siloxanes, at least one emulsifier and water comprising (i) premixing the constituents and (ii) emulsifying the mixture in a high-pressure homogenizer having at least one pressure stage and a pressure of from 2 to 15 MPa, so that the mean droplet size is less than 5 μm, wherein the width of the droplet size distribution, expressed as the span $$\frac{D90-D10}{D50}, \text{is} > 1.5,$$

wherein the emulsion is cooled on leaving the high-pressure homogenizer.

26. A process for preparing high-viscosity aqueous oil-in-water emulsions comprising functional alkoxysilanes and/or condensed oligomers thereof and/or organoalkoxy-siloxanes, at least one emulsifier and water comprising (i) premixing the constituents and (ii) emulsifying the mixture in a high-pressure homogenizer having at least one pressure stage and a pressure of from 2 to 15 MPa, so that the mean droplet size is less than 5 μm, wherein the width of the droplet size distribution, expressed as the span $$\frac{D90-D10}{D50}, \text{is} > 1.5,$$

wherein a pre-emulsifying (iii) is additionally carried out in the high-pressure homogenizer having at least one pressure stage under a pressure of from 20 to 40 MPa after said premixing (i) and before said emulsifying (ii).

* * * * *